(12) United States Patent
Oddy

(10) Patent No.: US 11,054,965 B2
(45) Date of Patent: *Jul. 6, 2021

(54) SYSTEMS AND METHODS FOR INDICATING HIGHLIGHTS WITHIN SPHERICAL VIDEOS

(71) Applicant: GoPro, Inc., San Mateo, CA (US)

(72) Inventor: David Oddy, Oceanside, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/455,217

(22) Filed: Jun. 27, 2019

(65) Prior Publication Data

US 2019/0317657 A1 Oct. 17, 2019

Related U.S. Application Data

(63) Continuation of application No. 15/673,915, filed on Aug. 10, 2017, now Pat. No. 10,402,043.

(51) Int. Cl.
| | |
|---|---|
| *G06F 3/048* | (2013.01) |
| *G06F 3/0481* | (2013.01) |
| *H04N 21/431* | (2011.01) |
| *H04N 21/218* | (2011.01) |

(52) U.S. Cl.
CPC ... *G06F 3/04815* (2013.01); *H04N 21/21805* (2013.01); *H04N 21/4312* (2013.01)

(58) Field of Classification Search
CPC .............. G06F 3/04815; G06F 3/0481; G06F 3/04817; H04N 21/4312; H04N 21/21805; H04N 21/431

See application file for complete search history.

(56) References Cited

U.S. PATENT DOCUMENTS

| | | |
|---|---|---|
| 9,082,018 B1 | 7/2015 | Laska |
| 9,836,853 B1 | 12/2017 | Médioni |
| 9,934,823 B1 * | 4/2018 | Bentley .............. G11B 27/3081 |
| 2002/0191952 A1 | 12/2002 | Fiore |
| 2003/0007567 A1 | 1/2003 | Newman |
| 2008/0298796 A1 | 12/2008 | Kuberka |
| 2009/0015718 A1 | 1/2009 | Hirai |

(Continued)

OTHER PUBLICATIONS

International Search Report and Written Opinion for PCT/US2018/062222 dated Feb. 12, 2019, 11 pages.
U.S. Appl. No. 15/673,915, filed Aug. 10, 2017. 55 pages.

*Primary Examiner* — Haoshian Shih

(74) *Attorney, Agent, or Firm* — Esplin & Associates, PC

(57) ABSTRACT

Spherical video content may be presented on a display. The spherical video content may include an event of interest occurring within an event field of view during an event moment. Interaction information may be received during the presentation of the spherical content on the display. The interaction information may indicate a user's viewing selections of the spherical video content. Display fields of view may be determined based on the user's viewing selections. Relative positions of the event field of view with respect to the display fields of view may be determined. Progress differences between the event moment and moments corresponding to the display fields of view may be determined. A visual indicator graphically displaying the relative positions and the progress differences may be presented on the display.

20 Claims, 7 Drawing Sheets

(56) References Cited

U.S. PATENT DOCUMENTS

| | | | |
|---|---|---|---|
| 2009/0083787 A1* | 3/2009 | Morris | H04N 21/4349 725/32 |
| 2009/0240431 A1* | 9/2009 | Chau | G01C 21/3647 701/532 |
| 2010/0171846 A1 | 7/2010 | Wood | |
| 2012/0194631 A1* | 8/2012 | Venolia | G06K 9/00315 348/14.1 |
| 2013/0210563 A1* | 8/2013 | Hollinger | H04N 5/2256 473/570 |
| 2014/0181755 A1* | 6/2014 | Oh | G06F 3/04815 715/848 |
| 2015/0012827 A1* | 1/2015 | Elmeih | A63F 13/5258 715/719 |
| 2016/0029105 A1 | 1/2016 | Newman | |
| 2016/0055381 A1 | 2/2016 | Adsumilli | |
| 2016/0092737 A1* | 3/2016 | Laska | G06F 3/0481 715/721 |
| 2016/0313903 A1* | 10/2016 | Rabinovitz | G16H 40/63 |
| 2016/0321841 A1* | 11/2016 | Christen | G06F 3/167 |
| 2017/0017855 A1 | 1/2017 | Karsh | |
| 2017/0076565 A1 | 3/2017 | Saboune | |
| 2017/0171846 A1 | 6/2017 | Zhao | |
| 2017/0249009 A1* | 8/2017 | Parshionikar | G06K 9/00315 |
| 2018/0182168 A1* | 6/2018 | Laurent | G06T 19/003 |
| 2018/0210542 A1* | 7/2018 | McLean | A63F 13/5372 |
| 2019/0072407 A1* | 3/2019 | Fang | G06T 17/05 |
| 2019/0289419 A1* | 9/2019 | Eronen | H04S 7/303 |

* cited by examiner

SYSTEMS AND METHODS FOR INDICATING HIGHLIGHTS WITHIN SPHERICAL VIDEOS

FIELD

This disclosure relates to indicating highlights within spherical videos based on relative position and progress difference of the highlights.

BACKGROUND

A video may include greater visual capture of one or more scenes/objects/activities (e.g., over-capture) than may be viewed at a time. Viewing a smaller portions of the visual capture may lead to missing highlights within the video.

SUMMARY

This disclosure relates to indicating highlights within spherical videos. Video information defining spherical video content and/or other information may be accessed. The spherical video content may have a progress length. The spherical video content may define visual content viewable from a point of view as a function of progress through the spherical video content. The spherical video content may include an event of interest occurring within an event field of view during an event moment within the progress length. The spherical video content may be presented on a display. Interaction information may be received during the presentation of the spherical content on the display. The interaction information may indicate a user's viewing selections of the spherical video content as the function of progress through the spherical video content. The user's viewing selections may include a first viewing selection for a first moment within the progress length. Display fields of view may be determined based on the user's viewing selections and/or other information. The display fields of view may define extents of the visual content viewable from the point of view as the function of progress through the spherical video content. A first display field of view may be determined based on the first viewing selection and/or other information.

Relative positions of the event field of view with respect to the display fields of view may be determined. A first relative position of the event field of view may be determined with respect to the first display field of view. Progress differences between the event moment and moments corresponding to the display fields of view may be determined. A first progress difference may be determined between the event moment and the first moment. A visual indicator may be presented on the display. The visual indicator may graphically display the relative positions of the event field of view with respect to the display fields of view and the progress differences between the event moment and the moments corresponding to the display fields of view. The visual indicator may include, at the first moment within the progress length, a first indicator graphically displaying the first relative position and the first progress difference.

A system that indicates highlights within spherical videos may include one or more of electronic storage, display, processor, and/or other components. The display may be configured to present video content and/or other information. In some implementations, the display may include a touchscreen display configured to receive user input indicating the user's viewing selections of the video content. The user's viewing selections may be determined based on the user input received via the touchscreen display. The touchscreen display may generate output signals indicating a location of the user's engagements with the touchscreen display. In some implementations, the display may include a motion sensor configured to generate output signals conveying motion information related to a motion of the display. In some implementations, the motion of the display may include an orientation of the display, and the user's viewing selections of the video content may be determined based on the orientation of the display.

The electronic storage may store video information defining video content, and/or other information. Video content may refer to media content that may be consumed as one or more videos. Video content may include one or more videos stored in one or more formats/container, and/or other video content. Video content may have a progress length. Video content may include visual content viewable as a function of progress through the video content. Video content may include audio content playable as a function of progress through the video content. In some implementations, video content may include one or more of spherical video content, virtual reality content, and/or other video content. Spherical video content and/or virtual reality content may define visual content viewable from one or more points of view as a function of progress through the spherical/virtual reality video content.

Video content may include one or more events of interest. An event of interest may occur during an event moment within the progress length. The event moment may include a point in time, a duration of time, a frame, and/or multiple frames within the progress length. For spherical video content/virtual reality video content, an event of interest may occur within an event field of view during the event moment. In some implementations, an event of interest may be associated with a given viewing projection.

The processor(s) may be configured by machine-readable instructions. Executing the machine-readable instructions may cause the processor(s) to facilitate indicating highlights within spherical videos. The machine-readable instructions may include one or more computer program components. The computer program components may include one or more of an access component, a presentation component, an interaction component, a viewing component, a comparison component, a visual indicator component, and/or other computer program components.

The access component may be configured to access the video information defining one or more video content and/or other information. The access component may access video information from one or more storage locations. The access component may be configured to access video information defining one or more video content during acquisition of the video content/the video information and/or after acquisition of the video content/the video information by one or more image sensors.

The presentation component may be configured to effectuate presentation of the video content on the display. For example, the presentation component may effectuate presentation of spherical video content on the display. In some implementations, the presentation component may be further configured to change the presentation of the video content (e.g., display field of view, viewing projection) based on the user's interaction with one or more visual indicators and/or other information.

The interaction component may be configured to receive interaction information and/or other information during the presentation of the video content on the display. For example, the interaction component may receive interaction information during the presentation of spherical video content on the display. The interaction information may indicate a user's viewing selections of the video content and/or other information as the function of progress through the spherical video content. The user's viewing selections may include a first viewing selection for a first moment within the progress length. In some implementations, the user's viewing selections may include viewing directions selected by the user for the video content as the function of progress through the video content, and/or other information. In some implementations, the user's viewing selections may include viewing zooms selected by the user for the video content as the function of progress through the video content. In some implementations, the interaction information may further indicate the user's interaction with one or more visual indicators.

In some implementations, the interaction information may be determined based on the location of the user's engagements with the touchscreen display, and/or other information. In some implementations, the interaction information may be determined based on the motion of the display, and/or other information.

The viewing component may be configured to determine display fields of view based on the user's viewing selections and/or other information. The display fields of view may be determined based on viewing directions and/or viewing zooms selected by the user. The display fields of view may define viewable extents of visual content within the video content. For the spherical video content, the display fields of view may define extents of the visual content viewable from the point of view as the function of progress through the spherical video content. The display fields of view may include a first display field of view and/or other display fields of view. The first display field of view may be determined based on the first viewing selection.

The comparison component may be configured to determine relative positions of the event field of view with respect to the display fields of view. A first relative position of the event field of view may be determined with respect to the first display field of view. The comparison component may be configured to determine progress differences between the event moment and moments corresponding to the display fields of view. A first progress difference may be determined between the event moment and the first moment.

The visual indicator component may be configured to effectuate presentation of one or more visual indicators on the display. In some implementations, one or more visual indicators may be presented within a radar indicator. In some implementations, the radar indicator may be overlaid on top of the presentation of the video content. In some implementations, one or more visual indicators may be presented at a periphery of the presentation of the video content.

A visual indicator may graphically display the relative positions of the event field of view with respect to the display fields of view, the progress differences between the event moment and the moments corresponding to the display fields of view, and/or other information. The visual indicator may include, at the first moment within the progress length, a first indicator graphically displaying the first relative position and the first progress difference. In some implementations, a prominence of the visual indicator may change based on the progress differences. In some implementations, a shape and/or a color of the visual indicator may change based on the relative positions or the progress differences.

In some implementations, the user may interact with the visual indicator to change the presentation of the video content on the display. For example, responsive to the user's interaction with the first indicator, the display fields of view may be changed to include the event field of view. Responsive to the user's interaction with the first indicator, the video content may be presented using the given viewing projection associated with the event of interest.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
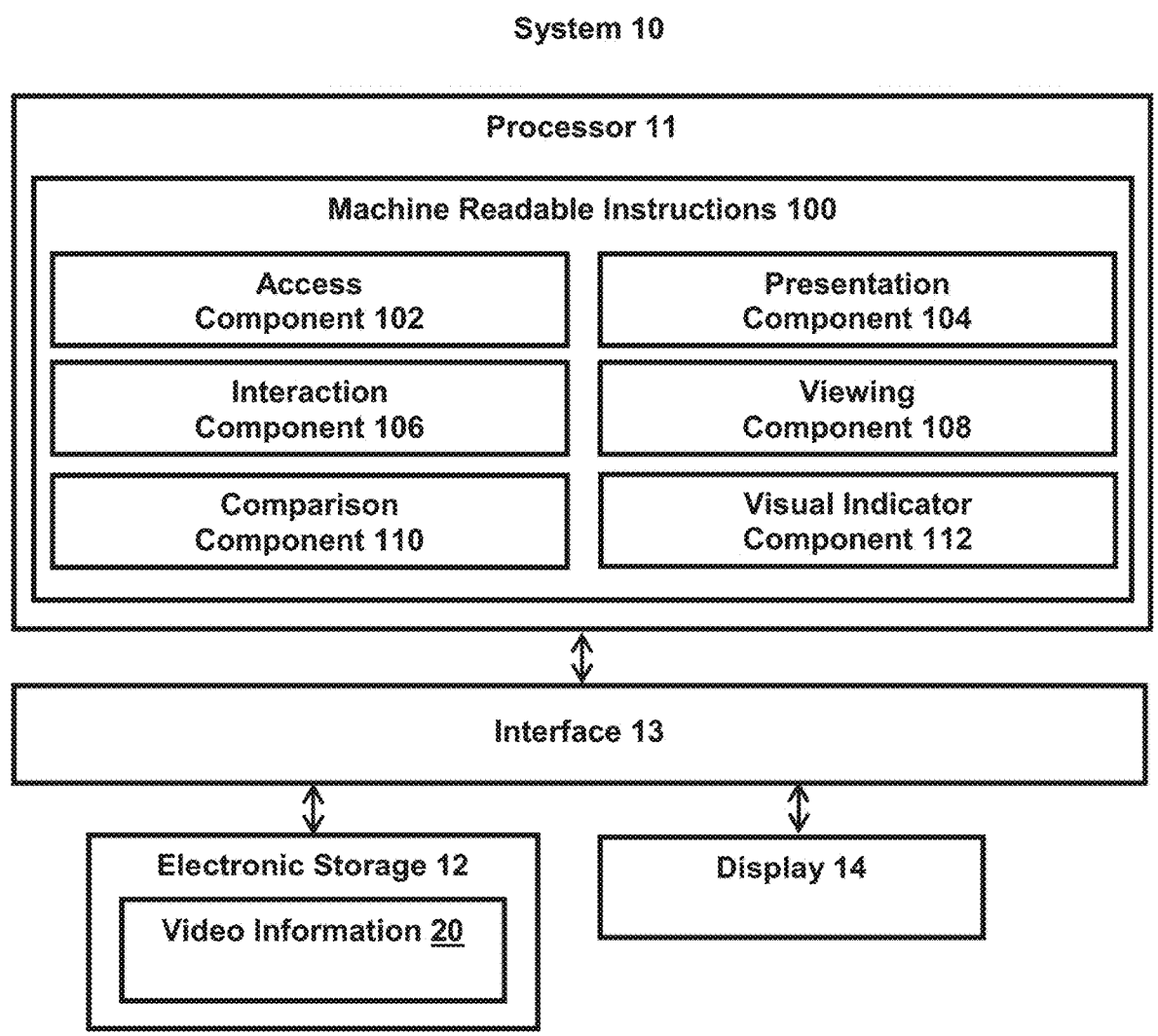
FIG. 1 illustrates a system that indicates highlights within spherical videos.

FIG. 1 illustrates a system 10 for indicating highlights within spherical videos. The system 10 may include one or more of a processor 11, an electronic storage 12, an interface 13 (e.g., bus, wireless interface), a display 14, and/or other components. Video information 20 defining spherical video content and/or other information may be accessed by the processor 11. The spherical video content may have a progress length. The spherical video content may define visual content viewable from a point of view as a function of progress through the spherical video content. The spherical video content may include an event of interest occurring within an event field of view during an event moment within the progress length. The spherical video content may be presented on the display 14. Interaction information may be received during the presentation of the spherical content on the display 14. The interaction information may indicate a user's viewing selections of the spherical video content as the function of progress through the spherical video content. The user's viewing selections may include a first viewing selection for a first moment within the progress length. Display fields of view may be determined based on the user's viewing selections and/or other information. The display fields of view may define extents of the visual content viewable from the point of view as the function of progress through the spherical video content. A first display field of view may be determined based on the first viewing selection and/or other information.

Relative positions of the event field of view with respect to the display fields of view may be determined. A first relative position of the event field of view may be determined with respect to the first display field of view. Progress differences between the event moment and moments corresponding to the display fields of view may be determined. A first progress difference may be determined between the event moment and the first moment. A visual indicator may be presented on the display 14. The visual indicator may graphically display the relative positions of the event field of view with respect to the display fields of view and the progress differences between the event moment and the moments corresponding to the display fields of view. The visual indicator may include, at the first moment within the progress length, a first indicator graphically displaying the first relative position and the first progress difference, and/or other indicators.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to video information, video content, event of interest, event field of view, event moment, interaction information, a user's viewing selections, display fields of view, relative positions, progress differences, visual indicators, and/or other information.

The electronic storage 12 may store video information 20 defining one or more video content. Video content may refer to media content that may be consumed as one or more videos. Video content may include one or more videos stored in one or more formats/container, and/or other video content. A format may refer to one or more ways in which the information defining video content is arranged/laid out (e.g., file format). A container may refer to one or more ways in which information defining video content is arranged/laid out in association with other information (e.g., wrapper format).

Video content may include a video clip captured by a video capture device, multiple video clips captured by a video capture device, and/or multiple video clips captured by separate video capture devices. Video content may include multiple video clips captured at the same time and/or multiple video clips captured at different times. Video content may include a video clip processed by a video application, multiple video clips processed by a video application and/or multiple video clips processed by separate video applications.

Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Video content may include visual content viewable as a function of progress through the video content. Video content may include audio content playable as a function of progress through the video content. In some implementations, video content may include one or more of spherical video content, virtual reality content, and/or other video content. Spherical video content and/or virtual reality content may define visual content viewable from one or more points of view as a function of progress through the spherical/virtual reality video content.

Spherical video content may refer to a video capture of multiple views from a single location. Spherical video content may include a full spherical video capture (360 degrees of capture) or a partial spherical video capture (less than 360 degrees of capture). Spherical video content may be captured through the use of one or more cameras/image sensors to capture images/videos from a location. For spherical video content captured using multiple cameras/image sensors, multiple images/videos captured by the multiple cameras/image sensors may be stitched together to form the spherical video content.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video capture from a path taken by the capturing device(s) in the moving position. For example, spherical video content and/or virtual reality content may include video capture from a person walking around in a music festival.

Video content may include one or more events of interest. An event of interest may refer to an occurrence/capture of an interesting thing (e.g., scene, object, thing, activity, action) within the video content. An event of interest may occur during an event moment within the progress length. The event moment may include a point in time, a duration of time, a frame, and/or multiple frames within the progress length. For spherical video content/virtual reality video content, an event of interest may occur within an event field of view during the event moment. An event field of view may refer to a viewing angle (e.g., viewing direction, viewing zoom) from a point of view of the spherical video content at which the event of interest is viewable.

In some implementations, an event of interest may be associated with a given viewing projection (e.g., equirectangular projection, stereographic projection). The given viewing projection may be associated with the event of interest based on user input (e.g., user designating a particular viewing projection to be used in viewing the event of interest), based on visual/audio content captured within the event of interest (e.g., based on analysis of the captured video content), and/or other information.

The display 14 may be configured to present video content and/or other information. In some implementations, the display 14 may include a touchscreen display configured to receive user input indicating the user's viewing selections of the video content. For example, the display 14 may include a touchscreen display of a mobile device (e.g., camera, smartphone, tablet, laptop). The touchscreen display may generate output signals indicating a location of the user's engagements with the touchscreen display.

A touchscreen display may include a touch-sensitive screen and/or other components. A user may engage with the touchscreen display by touching one or more portions of the touch-sensitive screen (e.g., with one or more fingers, stylus). A user may engage with the touchscreen display at a moment in time, at multiple moments in time, during a period, or during multiple periods. For example, a user may tap on the touchscreen display to interact with video content presented the display 14 and/or to interact with an application for presenting video content. A user may make a dragging motion on the touchscreen display or interact with viewing options presented on the touchscreen display to change the extent of the video content presented on the display. A user may pinch or unpinch the touchscreen display to effectuate change in zoom/magnification for presentation of the video content. A user may make a twisting motion (e.g., twisting two figures on the touchscreen display, holding one finger in position on the touchscreen display while twisting another figure on the touchscreen display) to effectuate visual rotation of the video content (e.g., warping visuals within the video content, changing viewing rotation). Other types of engagement of the touchscreen display by users are contemplated.

In some implementations, the display 14 may include one or more motion sensors configured to generate output signals conveying motion information related to a motion of the display 14. In some implementations, a motion sensor may include one or more of an accelerometer, a gyroscope, a magnetometer, an inertial measurement unit, a magnetic position sensor, a radio-frequency position sensor, and/or other motion sensors. Motion information may define one or more motions, positions, and/or orientations of the motion sensor/object monitored by the motion sensor (e.g., the display 14). Motion of the display 14 may include one or more of position of the display 14, orientation (e.g., yaw, pitch, roll) of the display 14, changes in position and/or orientation of the display 14, and/or other motion of the image sensor 14 at a time or over a period of time, and/or at a location or over a range of locations. For example, the display 14 may include a display of a smartphone held by a user, and the motion information may define the motion/position/orientation of the smartphone. The motion of the smartphone may include a position and/or an orientation of the smartphone, and the user's viewing selections of the video content may be determined based on the position and/or the orientation of the smartphone.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate indicating highlights within spherical videos. The machine readable instructions 100 may include one or more computer program components. The machine readable instructions 100 may include one or more of an access component 102, a presentation component 104, an interaction component 106, a viewing component 108, a comparison component 110, a visual indicator component 112, and/or other computer program components.

The access component 102 may be configured to access video information defining one or more video content and/or other information. The access component 102 may access video information from one or more storage locations. A storage location may include electronic storage 12, electronic storage of one or more image sensors (not shown in FIG. 1), electronic storage of a device accessible via a network, and/or other locations. For example, the access component 102 may access the video information 20 stored in the electronic storage 12. The access component 102 may be configured to access video information defining one or more video content during acquisition of the video content/the video information and/or after acquisition of the video content/the video information by one or more image sensors. For example, the access component 102 may access video information defining video while the video is being captured by one or more image sensors. The access component 102 may access video information defining a video after the video has been captured and stored in memory (e.g., the electronic storage 12).

Figure 3:
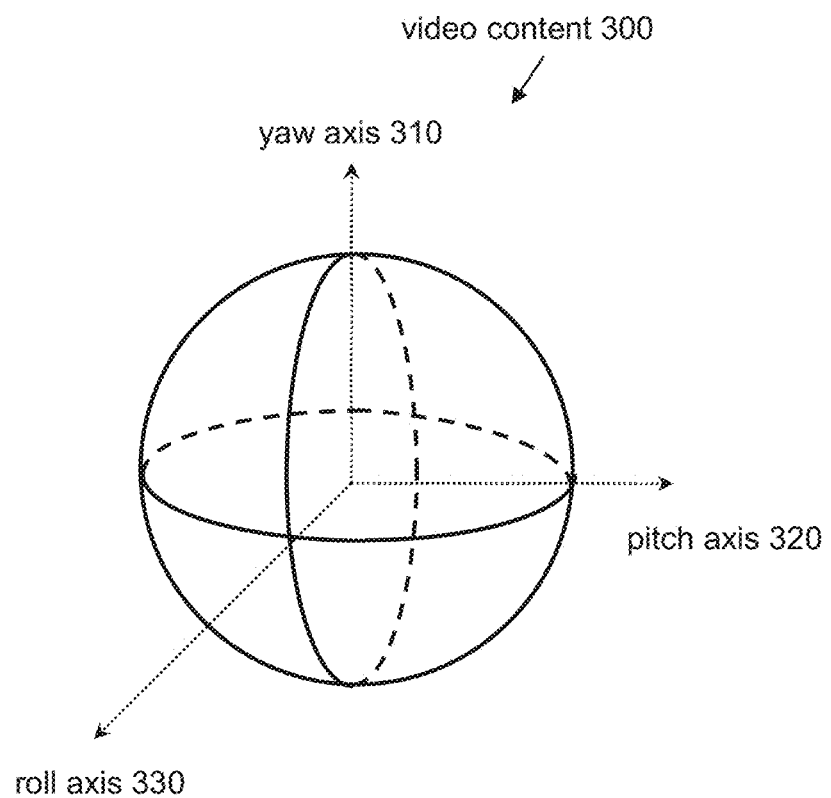
FIG. 3 illustrates an example spherical video content.

FIG. 3 illustrates an example video content 300 defined by video information. The video content 300 may include spherical video content. In some implementations, spherical video content may be stored with a 5.2K resolution. Using a 5.2K spherical video content may enable viewing windows for the spherical video content with resolution close to 1080p. FIG. 3 illustrates example rotational axes for the video content 300. Rotational axes for the video content 300 may include a yaw axis 310, a pitch axis 320, a roll axis 330, and/or other axes. Rotations about one or more of the yaw axis 310, the pitch axis 320, the roll axis 330, and/or other axes may define viewing directions/display fields of view for the video content 300.

For example, a 0-degree rotation of the video content 300 around the yaw axis 310 may correspond to a front viewing direction. A 90-degree rotation of the video content 300 around the yaw axis 310 may correspond to a right viewing direction. A 180-degree rotation of the video content 300 around the yaw axis 310 may correspond to a back viewing direction. A −90-degree rotation of the video content 300 around the yaw axis 310 may correspond to a left viewing direction.

A 0-degree rotation of the video content 300 around the pitch axis 320 may correspond to a viewing direction that is level with respect to horizon. A 45-degree rotation of the video content 300 around the pitch axis 320 may correspond to a viewing direction that is pitched up with respect to horizon by 45-degrees. A 90 degree rotation of the video content 300 around the pitch axis 320 may correspond to a viewing direction that is pitched up with respect to horizon by 90-degrees (looking up). A −45-degree rotation of the video content 300 around the pitch axis 320 may correspond to a viewing direction that is pitched down with respect to horizon by 45-degrees. A −90 degree rotation of the video content 300 around the pitch axis 320 may correspond to a viewing direction that is pitched down with respect to horizon by 90-degrees (looking down).

A 0-degree rotation of the video content 300 around the roll axis 330 may correspond to a viewing direction that is upright. A 90 degree rotation of the video content 300 around the roll axis 330 may correspond to a viewing direction that is rotated to the right by 90 degrees. A −90-degree rotation of the video content 300 around the roll axis 330 may correspond to a viewing direction that is rotated to the left by 90-degrees. Other rotations and viewing directions are contemplated.

The presentation component 104 may be configured to effectuate presentation of video content on the display 14. For example, the presentation component 104 may effectuate presentation of spherical video content on the display 14. Presentation of the video content on the display 14 may include presentation of the video content based on display fields of view. The display fields of view may define viewable extents of visual content within the video content. The display fields of view may be determined based on the user's viewing selections and/or other information. For example, based on the user's viewing selections including a particular viewing direction and/or viewing zoom for the video content 300, a given visual portion/extent of the video content 300 may be presented on the display 14. In some implementations, the presentation component 104 may be configured to change the presentation of the video content (e.g., display field of view, viewing projection) based on the user's interaction with one or more visual indicators and/or other information.

The interaction component 106 may be configured to receive interaction information during the presentation of video content on the display 14. For example, the interaction component 106 may receive interaction information during the presentation of spherical video content on the display 14. The interaction information may indicate how a user interacted with video content/display 14 to view the video content. For example, the user may interact with the display 14 by touching the display 14 and/or changing the rotation/tilt of the display 14 to provide the user's viewing selections, and the interaction information may indicate the user's interaction. The user may interact with one or more input devices (e.g., mouse, keyboard, microphone, motion sensor) coupled to the display 14 to provide the user's viewing selections, and the interaction information may indicate the user's interaction. In some implementations, the interaction information may further indicate the user's interaction with one or more visual indicators.

In some implementations, the interaction information may be determined based on the location of the user's engagements with the touchscreen display, and/or other information. For example, a user may touch the touchscreen display to interact with video content presented the display 14 and/or to interact with an application for presenting video content. A user may interact with the touchscreen display to pan the viewing direction (e.g., via dragging/tapping a finger on the touchscreen display, via interacting with options to change the viewing direction), to change the zoom (e.g., via pinching/unpinching the touchscreen display, via interacting with options to change the viewing zoom), to apply one or more visual effects (e.g., via making preset movements corresponding to visual effects on the touchscreen display, via interacting with options to apply visual effects), and/or provide other interaction information. Other interactions with the touchscreen display are contemplated.

In some implementations, the interaction information may be determined based on the motion of the display 14, and/or other information. For example, the interaction information may be determined based on one or more motions, positions, and/or orientation of the display 14 (e.g., as detected by one or more motion sensors). For example, the display 14 may include a display of a smartphone held by a user, and the interaction information may be determined based on the motion/position/orientation of the smartphone. A user's viewing selections may be determined based on the motion/position/orientation of the smartphone. Viewing directions for the video content selected by the user may be determined based on the motion/position/orientation of the smartphone. For example, based on the user tilting the smartphone upwards, the viewing directions for the video content may tilt upwards.

The interaction information may indicate a user's viewing selections of the video content and/or other information as the function of progress through the spherical video content. For example, the user's viewing selections may include a first viewing selection for a first moment within the progress length of the spherical video content (e.g., the video content 300), and/or other viewing selections for other moments within the progress length of the spherical video content. The user's viewing selections may be determined based on the user input received via the user's interaction with the display 14, the user's interaction with one or more input devices coupled to the display 14, the user's interaction with the video content, and/or other information.

The user's viewing selections may include viewing directions selected by the user for the video content as the function of progress through the video content, and/or other information. Viewing directions for the video content may correspond to orientations of the display fields of view selected by the user. In some implementations, viewing directions for the video content may be characterized by rotations around the yaw axis 310, the pitch axis 320, the roll axis 330, and/or other axes. Viewing directions for the video content may include the directions in which the user desires to view the video content.

Figures 4A, 4B:
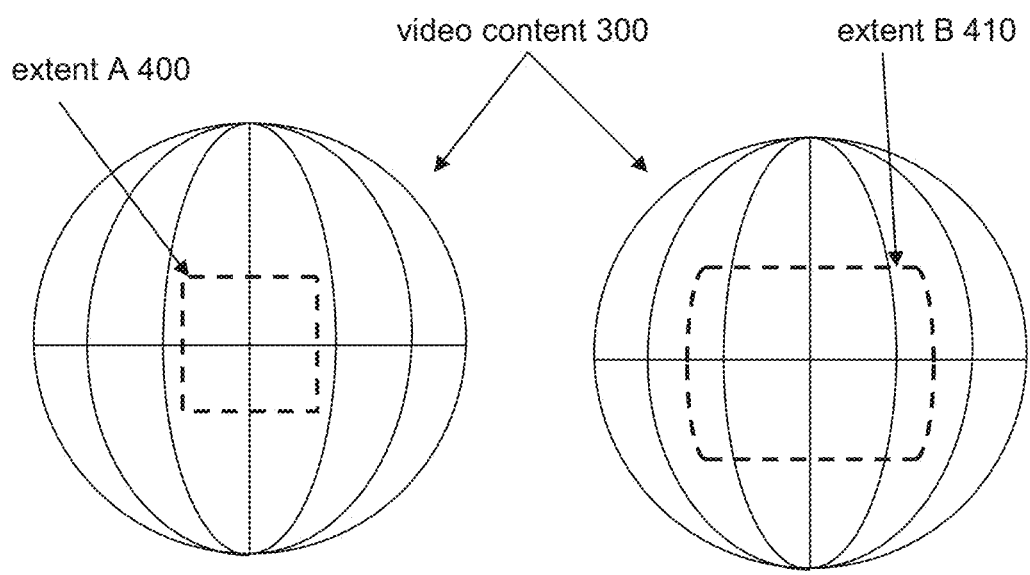
FIGS. 4A-4B illustrate example extents of spherical video content.

The user's viewing selections may include viewing zooms selected by the user for the video content as the function of progress through the video content. Viewing zooms for the video content may correspond to a size of the viewable extents of visual content within the video content. For example, FIGS. 4A-4B illustrate examples of extents for video content 300. In FIG. 4A, the size of the viewable extent of the video content 300 may correspond to the size of extent A 400. In FIG. 4B, the size of viewable extent of the video content 300 may correspond to the size of extent B 410. Viewable extent of the video content 300 in FIG. 4A may be smaller than viewable extent of the video content 300 in FIG. 4B.

A user's viewing selections of the video content may remain the same or change as a function of progress through the video content. For example, a user may view the video content without changing the viewing direction (e.g., a user may view a "default view" of video content captured at a music festival, etc.). A user may view the video content by changing the directions of view (e.g., a user may change the viewing direction of video content captured at a music festival to follow a particular band, etc.). Other changes in a user's viewing selections of the video content are contemplated.

Figure 5:
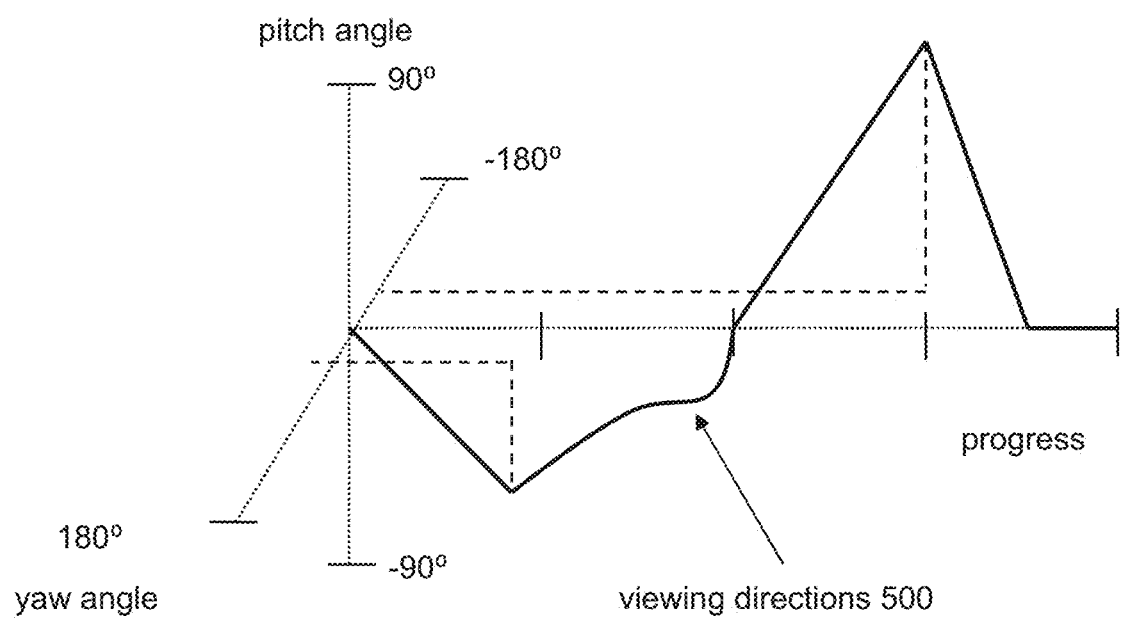
FIG. 5 illustrates example viewing directions selected by a user.

For example, FIG. 5 illustrates an exemplary viewing directions 500 selected by a user for video content as a function of progress through the video content. The viewing directions 500 may change as a function of progress through the video content. For example, at 0% progress mark, the viewing directions 500 may correspond to a zero-degree yaw angle and a zero-degree pitch angle. At 25% progress mark, the viewing directions 500 may correspond to a positive yaw angle and a negative pitch angle. At 50% progress mark, the viewing directions 500 may correspond to a zero-degree yaw angle and a zero-degree pitch angle. At 75% progress mark, the viewing directions 500 may correspond to a negative yaw angle and a positive pitch angle. At 87.5% progress mark, the viewing directions 500 may correspond to a zero-degree yaw angle and a zero-degree pitch angle. Other selections of viewing directions/selections are contemplated.

The viewing component 108 may be configured to determine display fields of view based on the user's viewing selections and/or other information. For example, the display fields of view may be determined based on viewing directions and/or viewing zooms selected by the user. The display fields of view may define viewable extents of visual content within the video content. For spherical video content, the display fields of view may define extents of the visual content viewable from a point of view (e.g., extent A 400 shown in FIG. 4A, extent B 410 shown in FIG. 4B) as the function of progress through the spherical video content. For example, the display fields of view may include a first display field of view and/or other display fields of view for the spherical video content (e.g., the video content 300). The first display field of view may be determined based on the first viewing selection for the first moment within the progress length of the spherical video content.

For example, based on an orientation of a mobile device presenting the video content, the viewing directions may be determined (e.g., the viewing directions 500 shown in FIG. 5) and the display fields of view may be determined based on the viewing directions. The display fields of view may change based on changes in the viewing directions (based on changes in the orientation of the mobile device), based on changes in the viewing zooms, and/or other information. For example, a user of a mobile device may be viewing video content while holding the mobile device in a landscape orientation. The display field of view may define a landscape viewable extent of the visual content within the video content. During the presentation of the video content, the user may switch the orientation of the mobile device to a portrait orientation. The display field of view may change to define a portrait viewable extent of the visual content within the video content.

For example, the viewing component 108 may determine display fields of view based on an orientation of a mobile device presenting spherical video content. Determining the display fields of view may include determining a viewing angle in the spherical video content that corresponds to the orientation of the mobile device. The viewing component 108 may determine display field of view based on the orientation of the mobile device and/or other information. For example, the display field of view may include a particular horizontal field of view (e.g., left, right) based on the mobile device being rotated left and right. The display field of view may include a particular vertical field of view (e.g., up, down) based on the mobile device being rotated up and down. Other display fields of view are contemplated.

The comparison component 110 may be configured to determine relative positions of the event field of view with respect to the display fields of view. For example, a first relative position of the event field of view may be determined with respect to the first display field of view. The relative positions of the event field of view with respect to the display fields of view may be determined in terms of distances between the event field of view and the display fields of view, in terms of orientations of the event field of view with respect to the display field of view, and/or in terms of other measurements.

Figure 6A:
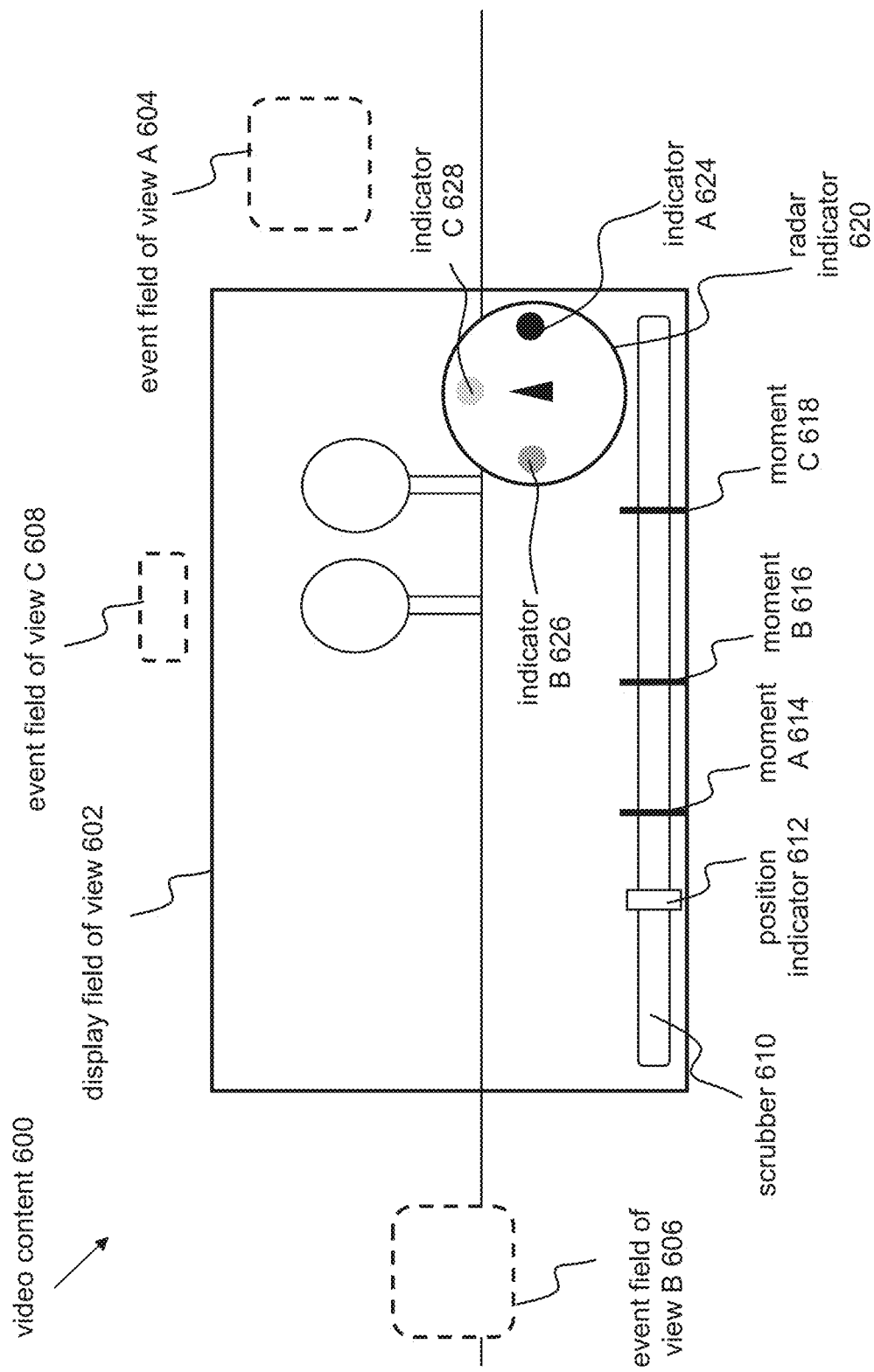
FIGS. 6A-6B illustrate example visual indicators for indicating highlights within spherical videos.

For example, FIG. 6A illustrates an example video content 600 (e.g., spherical video content) presented on a display (e.g., the display 14). The video content 600 shown in FIG. 6A may correspond to a given video frame (e.g., spherical video frame) of the video content at a given moment (e.g., the first moment). The video content 600 may include visual capture of three events of interests. One event of interest may be viewable within an event field of view A 604. Another event of interest may be viewable within an event field of view B 606. Another event of interest may be viewable within an event field of view C 608. Other numbers and locations of events of interest are contemplated. Other shapes and sizes of event fields of view are contemplated.

A display field of view 602 may define viewable extents of the visual content within the video content 600. The event field of view A 604, the event field of view B 606, and the event field of view C 608 may be located outside the display field of view 602. The comparison component 110 may determine relative positions of the event fields of view 604, 606, 608 with respect to the display field of view 602. The comparison component 110 may determine distances (e.g., center to center distances, edge to edge distances) between the event fields of view 604, 606, 608 and respect to the display field of view 602. The component 110 may determine orientation (e.g., above, below, to the right, to the left, at a particular angle) of the event fields of view 604, 606, 608 with respect to the display field of view 602.

The comparison component 110 may be configured to determine progress differences between the event moment and moments corresponding to the display fields of view. For example, a first progress difference may be determined between the event moment and the first moment. The progress differences between the event moment and moments corresponding to the display fields of view may be determined in term of time durations, in terms of frame numbers, and/or in terms of other measurements.

For example, referring to FIG. 6A, a scrubber 610 may represent the progress length of the video content 600. A position indicator 612 may indicate the current moment of the video content being displayed. That is, the visual content of the video content 600 displayed on the display 14 may correspond to the moment indicated by the position indicator 612. In some implementations, a user may be able to change the position of the position indicator 612 to change which portion of the video content 610 is displayed. Moments corresponding to the events of interest may be visually represented on the scrubber 610. For example, an event of interest may be viewable within the event field of view A 604 during moment A 614. Another event of interest may be viewable within the event field of view B 606 during moment B 616. Another event of interest may be viewable within the event field of view C 608 during moment C 618.

The comparison component 110 may determine progress difference between the moment A 614 and moment corresponding to the display field of view 602 (indicated by the position indicator 612). The comparison component 110 may determine progress difference between the moment B 616 and moment corresponding to the display field of view 602 (indicated by the position indicator 612). The comparison component 110 may determine progress difference between the moment C 618 and moment corresponding to the display field of view 602 (indicated by the position indicator 612). The progress differences may be determined in terms of (play) time durations between the different moment, in terms of number of video frames between the different moments, and/or in terms of other measurements. In some implementations, the progress differences may include information on whether the event moments (moment A, 614, moment B 616, moment C 618) precede, overlap, and/or comes after the moment corresponding to the display field of view 602.

The visual indicator component 112 may be configured to effectuate presentation of one or more visual indicators on the display. A visual indicator may refer to one or more visual elements presented on the display. One or more aspects of a visual indicator may be static and/or dynamic. In some implementations, one or more visual indicators may be presented within a radar indicator. A radar indicator may refer to a visual element that facilitates conveyance of different spatial positions within the video content. For example, FIG. 6A shows an example radar indicator 620. Presented within the radar indicator 620 are three visual indicators: indicator A 624, indicator B 626, and indicator C 628. In some implementations, the radar indicator may be overlaid on top of the presentation of the video content. For example, referring to FIG. 6A, the radar indicator 620 may be overlaid on top of the presentation of the video content 600 that a portion of the video content 600 is hidden from view. In some implementations, the radar indicator may be presented separately from the video content such that the radar indicator does not hide a portion of the video content.

Figure 6B:
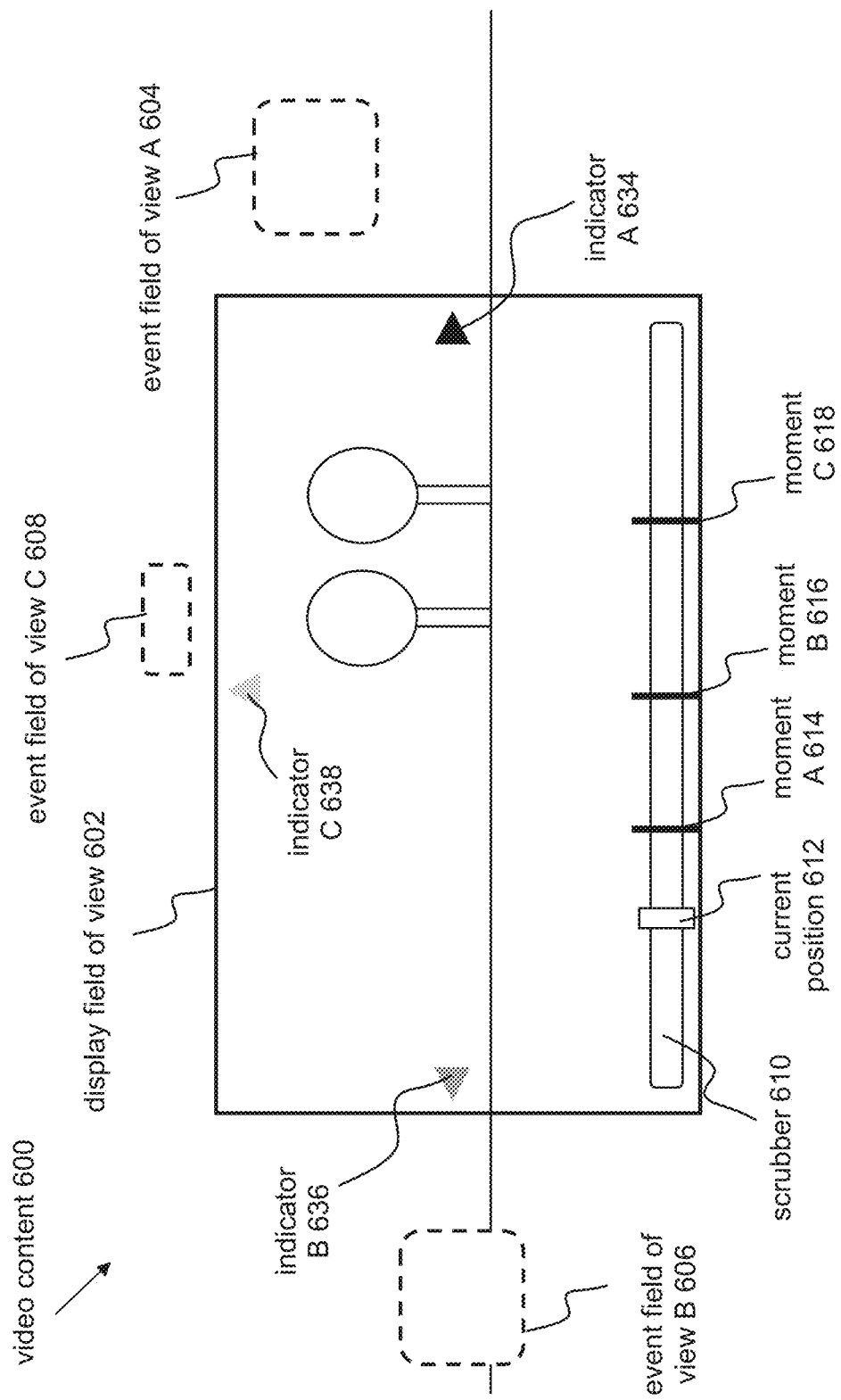

In some implementations, one or more visual indicators may be presented at a periphery of the presentation of the video content. For example, FIG. 6B, shows an example of three visual indicators presented at the periphery of the presentation of the video content (e.g., the periphery of the display field of view 602): indicator A 634, indicator B 636, and indicator C 638. Other placements of visual indicators are contemplated.

A visual indicator may graphically display the relative positions of the event field of view with respect to the display fields of view, the progress differences between the event moment and the moments corresponding to the display fields of view, and/or other information. For example, a visual indicator may include, at the first moment within the progress length, a first indicator graphically displaying the first relative position and the first progress difference.

Referring to FIG. 6A, at a moment within the progress length corresponding to the moment indicated by the position indicator 612, the indicator A 624 may graphically display the relative position of the event field of view A 604 with respect to the display field of view 602 by being placed within the right portion of the radar indicator 620 to indicate that the event field of view A 604 is to the right of the display field of view 602. The indicator A 624 may graphically display the progress differences between the moment A 614 and the moment indicated by the position indicator 612 (e.g., current moment) by its color (e.g., black shading).

The indicator B 626 may graphically display the relative position of the event field of view B 606 with respect to the display field of view 602 by being placed within the left portion of the radar indicator 620 to indicate that the event field of view B 606 is to the left of the display field of view 602. The indicator B 626 may graphically display the progress differences between the moment B 616 and the moment indicated by the position indicator 612 (e.g., current moment) by its color (e.g., dark grey shading).

The indicator C 628 may graphically display the relative position of the event field of view C 608 with respect to the display field of view 602 by being placed within the top portion of the radar indicator 620 to indicate that the event field of view C 608 is above the display field of view 602. The indicator C 628 may graphically display the progress differences between the moment C 618 and the moment indicated by the position indicator 612 (e.g., current moment) by its color (e.g., light grey shading).

Referring to FIG. 6B, at a moment within the progress length corresponding to the moment indicated by the position indicator 612, the indicator A 634 may graphically display the relative position of the event field of view A 604 with respect to the display field of view 602 by being placed within the right portion of the periphery of the display field of view 602 to indicate that the event field of view A 604 is to the right of the display field of view 602. The indicator A 634 may graphically display the progress differences between the moment A 614 and the moment indicated by the position indicator 612 (e.g., current moment) by its color (e.g., black shading).

The indicator B 636 may graphically display the relative position of the event field of view B 606 with respect to the display field of view 602 by being placed within the left portion of the periphery of the display field of view 602 to indicate that the event field of view B 606 is to the left of the display field of view 602. The indicator B 636 may graphically display the progress differences between the moment B 616 and the moment indicated by the position indicator 612 (e.g., current moment) by its color (e.g., dark grey shading).

The indicator C 638 may graphically display the relative position of the event field of view C 608 with respect to the display field of view 602 by being placed within the top portion of the periphery of the display field of view 602 to indicate that the event field of view C 608 is above the display field of view 602. The indicator C 638 may graphically display the progress differences between the moment C 618 and the moment indicated by the position indicator 612 (e.g., current moment) by its color (e.g., light grey shading).

As shown in FIGS. 6A-6B, the prominence of the visual indicators may change based on the progress differences. For example, closer the event moments are in terms of progress difference to the moment corresponding to the position indicator 612 (e.g., current moment), the appearance of the visual indicators may be made more prominent (e.g., color of the visual indicator may be darker for closer event moments). As the presentation of the video content progresses to approach an event moment, the visual indicator may gain visual prominence. As the presentation of the video content progress to go past the event moment, the visual indicator may lose visual prominence (e.g., diminishes) until the visual indicator disappears from view. As another example, the size and/or shape of visual indicators may change to change the prominence of the visual indicators based on the progress differences. Other visual changes to change the prominence of the visual indicators are contemplated.

The visual indicators shown in FIGS. 6A-6B are merely shown as examples and are not meant to be limiting. Other shapes, positioning, colors, and/or other visual characteristics of the visual indicators are contemplate. For example, referring to FIG. 6A, the indicator A 624 may be position within the upper right portion of the radar indicator to graphically display that the event field of view A 604 is located to the right and above the center horizon of the display field of view 602. Referring to FIG. 6B, the indicator C 638 may be tilted to the right so the tip of the triangle points towards the event field of view C 608 or the indicator C 638 may be positioned directly below the event field of view C 608 (shifted to the right from the position shown in FIG. 6B) to graphically display that the event field of view C 608 is located above and to the right of the center vertical of the display field of view 602.

In some implementations, a shape and/or color of the visual indicator may change based on the relative positions and/or the progress differences. For example, the shape/color of the visual indicator may be different based on whether the event field of view is located above, below, to the left, or to the right of the display field of view (e.g., triangles of different tilt as shown in FIG. 6B). As another example, the shape/color of the visual indicator may change based on whether the event moments (e.g., moment A, 614, moment B 616, moment C 618) precede, overlap, and/or comes after the moment corresponding to the display field of view 602 (e.g., current moment).

In some implementations, the user may interact with a visual indicator to change the presentation of the video content on the display. For example, responsive to the user's interaction with the first indicator, the display fields of view may be changed to include the event field of view. For example, referring to FIG. 6A, responsive to a user's interaction with the indicator A 624, the display field of view 602 may be changed to include the event field of view A 604. The change to the display field of view 602 may include changes to include the event field of view A 604 within a portion of the display field of view 602 (e.g., panning the display field of view 602 to the right to include the event field of view A 604 within the periphery of the display field of view 602). The change to the display field of view 602 may include changes to include the event field of view A 604 within a center portion of the display field of view 602 (e.g., panning the display field of view 602 to the right and up to include the event field of view A 604 at the display field of view 602). The change to the display field of view 602 may include changes to zoom in/out to the event field of view (e.g., zooming in for the event field of view A 604).

In some implementations, an event of interest may be associated with a given viewing projection (e.g., equirectangular projection, stereographic projection), and responsive to the user's interaction with the first indicator, the video content may be presented using the given viewing projection associated with the event of interest. Such may enable the user to view the event of interest using the viewing projection associated with the event of interest.

In some implementations, a user may interact with the radar indicator 620 to change the presentation of the video content/the display field of view 602. For example, the user may drag a portion of the radar indicator (e.g., via touch, via click and drag using a mouse) to change the extent of the video content presented within the display field of view 602. In some implementations, the radar indicator may be shown as a sphere, and a user may change the extent of the video content presented within the display field of view 602 by selecting a portion for presentation via interacting with the spherical radar indicator and/or drag a portion of the spherical radar indicator.

While the description herein may be directed to video content, one or more other implementations of the system/method described herein may be configured for other types media content. Other types of media content may include one or more of audio content (e.g., music, podcasts, audio books, and/or other audio content), multimedia presentations, images, slideshows, visual content (one or more images and/or videos), and/or other media content. For example, for presentation of photos, the visual indicator may graphically display the relative positions of the event field of view with respect to the display fields of view.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
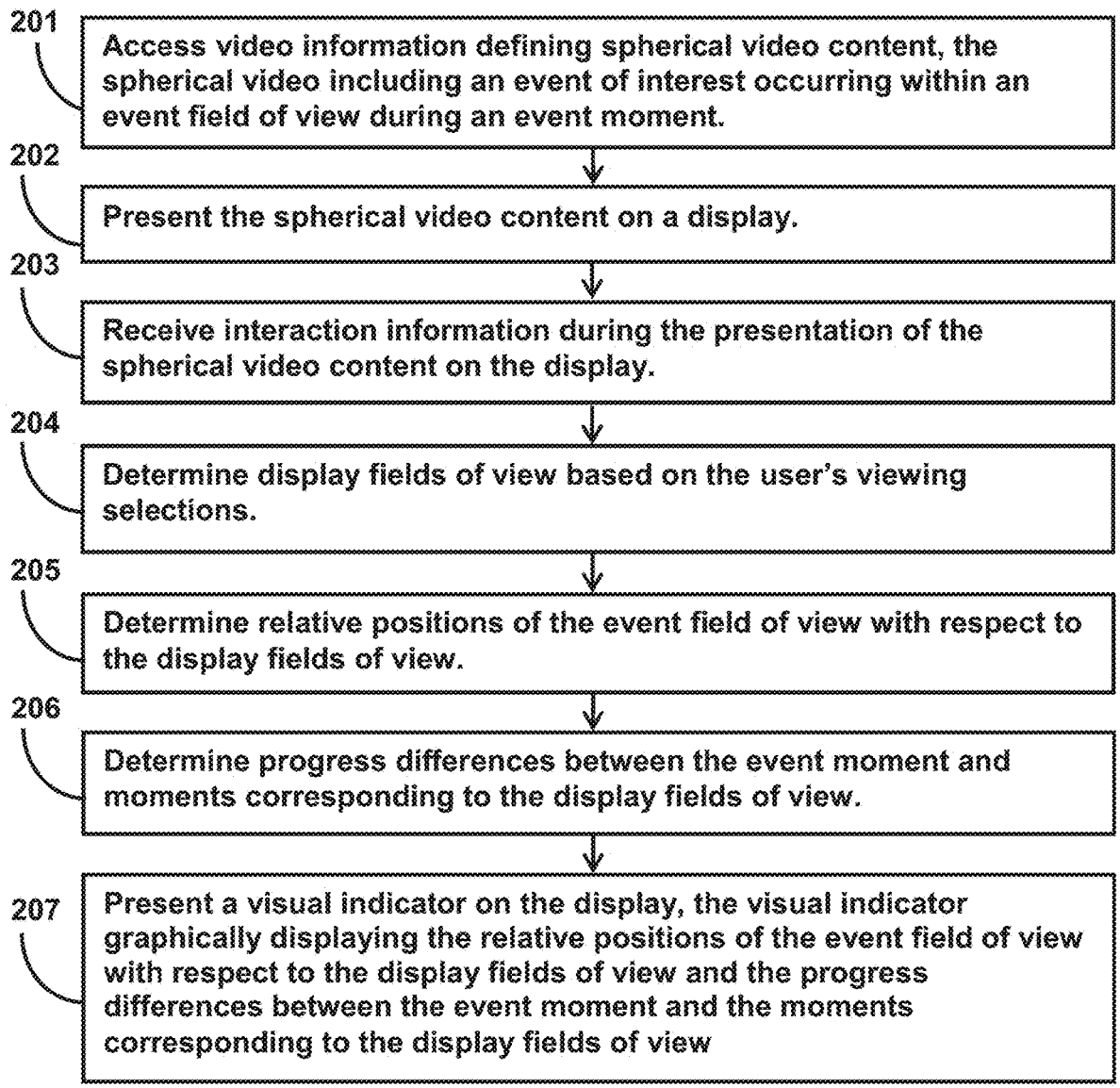
FIG. 2 illustrates a method for indicating highlights within spherical videos.

FIG. 2 illustrates method 200 for indicating highlights within spherical videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining spherical video content may be accessed. The spherical video content may have a progress length. The spherical video content may define visual content viewable from a point of view as a function of progress through the spherical video content. The spherical video content may include an event of interest. The event of interest may occur within an event field of view during an event moment within the progress length. In some implementation, operation 201 may be performed by a processor component the same as or similar to the access component 102 (Shown in FIG. 1 and described herein).

At operation 202, the spherical video content may be presented on a display. In some implementations, operation 202 may be performed by a processor component the same as or similar to the presentation component 104 (Shown in FIG. 1 and described herein).

At operation 203, interaction information may be received during the presentation of the spherical video content on the display. The interaction information may indicate a user's viewing selections of the spherical video content as the function of progress through the spherical video content. In some implementations, operation 203 may be performed by a processor component the same as or similar to the interaction component 106 (Shown in FIG. 1 and described herein).

At operation 204, display fields of view may be determined based on the user's viewing selections. The display fields of view may define extents of the visual content viewable from the point of view as the function of progress through the spherical video content. In some implementations, operation 204 may be performed by a processor component the same as or similar to the viewing component 108 (Shown in FIG. 1 and described herein).

At operation 205, relative positions of the event field of view with respect to the display fields of view may be determined. In some implementations, operation 205 may be performed by a processor component the same as or similar to the comparison component 110 (Shown in FIG. 1 and described herein).

At operation 206, progress differences between the event moment and moments corresponding to the display fields of view may be determined. In some implementations, operation 206 may be performed by a processor component the same as or similar to the comparison component 110 (Shown in FIG. 1 and described herein).

At operation 207, a visual indicator may be presented on the display. The visual indicator may graphically display the relative positions of the event field of view with respect to the display fields of view and the progress differences between the event moment and the moments corresponding to the display fields of view. In some implementations, operation 207 may be performed by a processor component the same as or similar to the visual indicator component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for indicating highlights within spherical videos, the system comprising:
    a display configured to present video content; and
    one or more physical processors configured by machine-readable instructions to:
        access video information defining spherical video content, the spherical video content having a progress length, the spherical video content defining visual content viewable from a point of view as a function of progress through the spherical video content, the spherical video content including an event of interest occurring within an event field of view during an event moment within the progress length;
        effectuate presentation of the spherical video content on the display;
        receive a user's viewing selections of the spherical video content as the function of progress through the spherical video content;
        determine display fields of view based on the user's viewing selections, the display fields of view defining extents of the visual content viewable from the point of view as the function of progress through the spherical video content, the display fields of view including a first display field of view defining a first extent of the visual content for a first moment within the progress length and a second display field of view defining a second extent of the visual content for a second moment within the progress length, the first display field of view different from the second display field of view;

determine relative positions of the event field of view with respect to the display fields of view corresponding to current moment within the progress length that is presented on the display;

determine positions of a visual indicator on the display based on the relative positions of the event field of view with respect to the display fields of view corresponding to the current moment within the progress length that is presented on the display, the positions of the visual indicator graphically displaying the relative positions of the event field of view with respect to the display fields of view corresponding to the current moment within the progress length that is presented on the display;

determine progress differences between the event moment and the current moment within the progress length that is presented on the display; and determine shapes or sizes of the visual indicator for the current moment within the progress length that is presented on the display based on the progress differences between the event moment and the current moment within the progress length that is presented on the display, the shapes or the sizes of the visual indicator graphically displaying the progress differences between the event moment and the current moment within the progress length that is presented on the display.

2. The system of claim 1, wherein the user's viewing selections include the user's viewing directions and viewing zooms selected by the user for the spherical video content as the function of progress through the spherical video content.

3. The system of claim 1, wherein:
the one or more physical processors are further configured by the machine-readable instructions to change the presentation of the spherical video content based on the user's interaction with the visual indicator such that responsive to the user's interaction with the visual indicator, the display fields of view are automatically panned to include the event field of view.

4. The system of claim 1, wherein:
the event of interest is associated with a stereographic projection, and
the one or more physical processors are further configured by the machine-readable instructions to change the presentation of the spherical video content based on the user's interaction with the visual indicator such that responsive to the user's interaction with the visual indicator, the spherical video content is automatically presented using the stereographic projection.

5. The system of claim 1, wherein the visual indicator is presented at a periphery of the presentation of the spherical video content.

6. The system of claim 1, wherein the sizes of the visual indicator are determined based on the progress differences such that the visual indicator disappears based on the moments corresponding to the display field of view going past the event moment.

7. The system of claim 1, wherein both the shapes and sizes of the visual indicator are determined based on the progress differences between the event moment and the moments corresponding to the display fields of view.

8. A method for indicating highlights within spherical videos, the method performed by a computing system including one or more physical processors, the method comprising:

accessing, by the computing system, video information defining spherical video content, the spherical video content having a progress length, the spherical video content defining visual content viewable from a point of view as a function of progress through the spherical video content, the spherical video content including an event of interest occurring within an event field of view during an event moment within the progress length;

effectuating, by the computing system, presentation of the spherical video content on a display;

receiving, by the computing system, a user's viewing selections of the spherical video content as the function of progress through the spherical video content;

determining, by the computing system, display fields of view based on the user's viewing selections, the display fields of view defining extents of the visual content viewable from the point of view as the function of progress through the spherical video content, the display fields of view including a first display field of view defining a first extent of the visual content for a first moment within the progress length and a second display field of view defining a second extent of the visual content for a second moment within the progress length, the first display field of view different from the second display field of view;

determining, by the computing system, relative positions of the event field of view with respect to the display fields of view corresponding to current moment within the progress length that is presented on the display;

determining, by the computing system, positions of a visual indicator on the display based on the relative positions of the event field of view with respect to the display fields of view corresponding to the current moment within the progress length that is presented on the display, the positions of the visual indicator graphically displaying the relative positions of the event field of view with respect to the display fields of view corresponding to the current moment within the progress length that is presented on the display;

determining, by the computing system, progress differences between the event moment and the current moment within the progress length that is presented on the display; and determining, by the computing system, shapes or sizes of the visual indicator for the current moment within the progress length that is presented on the display based on the progress differences between the event moment and the current moment within the progress length that is presented on the display, the shapes or the sizes of the visual indicator graphically displaying the progress differences between the event moment and the current moment within the progress length that is presented on the display.

9. The method of claim 8, wherein the user's viewing selections include the user's viewing directions and viewing zooms selected by the user for the spherical video content as the function of progress through the spherical video content.

10. The method of claim 8, further comprising:
changing, by the computing system, the presentation of the spherical video content based on the user's interaction with the visual indicator such that responsive to the user's interaction with the visual indicator, the display fields of view are automatically panned to include the event field of view.

11. The method of claim 8, wherein the event of interest is associated with a stereographic projection, the method further comprising:
changing, by the computing system, the presentation of the spherical video content based on the user's interaction with the visual indicator such that responsive to the user's interaction with the visual indicator, the spherical video content is automatically presented using the stereographic projection.

12. The method of claim 8, wherein the visual indicator is presented at a periphery of the presentation of the spherical video content.

13. The method of claim 8, wherein the sizes of the visual indicator are determined based on the progress differences such that the visual indicator disappears based on the moments corresponding to the display field of view going past the event moment.

14. The method of claim 8, wherein both the shapes and sizes of the visual indicator are determined based on the progress differences between the event moment and the moments corresponding to the display fields of view.

15. A system for indicating highlights within spherical videos, the system comprising:
a display configured to present video content; and
one or more physical processors configured by machine-readable instructions to:
access video information defining spherical video content, the spherical video content having a progress length, the spherical video content defining visual content viewable from a point of view as a function of progress through the spherical video content, the spherical video content including an event of interest occurring within an event field of view during an event moment within the progress length;
effectuate presentation of the spherical video content on the display;
receive (1) a user's viewing selections of the spherical video content as the function of progress through the spherical video content, the user's viewing selections including the user's viewing directions and viewing zooms selected by the user for the spherical video content as the function of progress through the spherical video content, and (2) the user's interaction with a visual indicator;
determine display fields of view based on the user's viewing selections, the display fields of view defining extents of the visual content viewable from the point of view as the function of progress through the spherical video content, the display fields of view including a first display field of view defining a first extent of the visual content for a first moment within the progress length and a second display field of view defining a second extent of the visual content for a second moment within the progress length, the first display field of view different from the second display field of view;
determine relative positions of the event field of view with respect to the display fields of view corresponding to current moment within the progress length that is presented on the display;
determine positions of the visual indicator on the display based on the relative positions of the event field of view with respect to the display fields of view corresponding to the current moment within the progress length that is presented on the display, the positions of the visual indicator graphically displaying the relative positions of the event field of view with respect to the display fields of view corresponding to the current moment within the progress length that is presented on the display;
determine progress differences between the event moment and the current moment within the progress length that is presented on the display;
determine shapes or sizes of the visual indicator for the current moment within the progress length that is presented on the display based on the progress differences between the event moment and the current moment within the progress length that is presented on the display, the shapes or the sizes of the visual indicator graphically displaying the progress differences between the event moment and the current moment within the progress length that is presented on the display; and
change the presentation of the spherical video content based on the user's interaction with the visual indicator such that responsive to the user's interaction with the visual indicator, the display fields of view are automatically panned to include the event field of view.

16. The system of claim 15, wherein:
the event of interest is associated with a stereographic projection, and
the one or more physical processors are further configured by the machine-readable instructions to change the presentation of the spherical video content based on the user's interaction with the visual indicator such that responsive to the user's interaction with the visual indicator, the spherical video content is automatically presented using the stereographic projection.

17. The system of claim 5, wherein the visual indicator is presented at a center point along a top periphery, a left periphery, a bottom periphery, or a right periphery of the presentation of the spherical video content, the visual indicator including a tip, and the visual indicator is tilted to point in a direction of the event field of view from the display fields of view corresponding to the current moment within the progress length that is presented on the display.

18. The system of claim 1, wherein the visual indicator for the event of interest is presented separately from a scrubber indicator for the event of interest, the scrubber indicator positioned on a scrubber, the scrubber representing the progress length of the spherical video content, the position of the scrubber indicator on the scrubber graphically displaying position of the event moment within the progress length of the spherical video content.

19. The method of claim 12, wherein the visual indicator is presented at a center point along a top periphery, a left periphery, a bottom periphery, or a right periphery of the presentation of the spherical video content, the visual indicator including a tip, and the visual indicator is tilted to point in a direction of the event field of view from the display fields of view corresponding to the current moment within the progress length that is presented on the display.

20. The method of claim 8, wherein the visual indicator for the event of interest is presented separately from a scrubber indicator for the event of interest, the scrubber indicator positioned on a scrubber, the scrubber representing the progress length of the spherical video content, the position of the scrubber indicator on the scrubber graphically displaying position of the event moment within the progress length of the spherical video content.

* * * * *